United States Patent [19]

McCray

[11] Patent Number: 4,876,009
[45] Date of Patent: Oct. 24, 1989

[54] TETRAKIS-AMIDO HIGH FLUX MEMBRANES

[75] Inventor: Scott B. McCray, Bend, Oreg.

[73] Assignee: Bend Research, Inc., Bend, Oreg.

[21] Appl. No.: 260,585

[22] Filed: Oct. 21, 1988

[51] Int. Cl.$^4$ .................. B01D 13/00; B01D 13/01
[52] U.S. Cl. ....................... 210/500.33; 210/500.35; 210/500.37
[58] Field of Search ........... 210/500.1, 500.21, 500.27, 210/500.28, 500.33, 500.34, 500.35, 500.36, 500.37, 500.41, 321.61

[56] References Cited

U.S. PATENT DOCUMENTS

| Re. 31,389 | 9/1983 | Braver et al. | 210/321.61 |
| 4,039,440 | 8/1977 | Cadotte | 210/23 H |
| 4,259,183 | 3/1981 | Cadotte | 210/654 |
| 4,277,344 | 7/1981 | Cadotte | 210/654 |
| 4,529,646 | 7/1985 | Sundet | 428/315.5 |

*Primary Examiner*—Frank Sever
*Attorney, Agent, or Firm*—Chernoff, Vilhauer, McClung & Stenzel

[57] ABSTRACT

Composite RO membranes of a microporous polymeric support and a polyamide reaction product of a tetrakis-aminomethyl compound and a polyacylhalide are disclosed, said membranes exhibiting high flux and good chlorine resistance.

8 Claims, No Drawings

TETRAKIS-AMIDO HIGH FLUX MEMBRANES

The government has rights in this invention under Contract No. DAAK-70-85-C-0059 awarded by the U.S. Army and under Contract No. DE-AC03-85-ER-80233 awarded by the Department of Energy.

BACKGROUND OF THE INVENTION

Composite polyamido reverse osmosis (RO) membranes are known. See, for example, U.S. Pat. Nos. 4,259,183, 4,529,646, 4,277,344 and 4,039,440. However, there is still a need in the RO art for high flux membranes that are resistant to attack by halogens such as chlorine, often present in brackish feed waters. The present invention comprises a novel RO membrane having a "loose" molecular structure that exhibits extraordinarily high flux and high resistance to chlorine attack.

SUMMARY OF THE INVENTION

The present invention comprises a composite RO membrane comprising a microporous polymeric support and the polyamide reaction product of a tetrakis-aminomethyl compound of the formula $C$―$(NHMe)_4$ with an aromatic polyacylhalide of the formula $Ar$―$(COX)_n$, where Me is methyl, Ar is aryl, X is halide, and n is 2 or 3. The resulting polyamide is believed to be of the general structure I or II

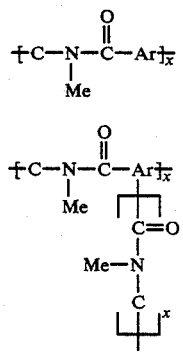

where Me and Ar are as defined above and x is an integer reflecting the degree of polymerization. When n is 2, polyamides of structure I are obtained, and when n is 3, polyamides of structure II are obtained.

DETAILED DESCRIPTION OF THE INVENTION

According to the present invention, there is provided a novel class of loosely molecular structured or "leaky" high flux and chlorine-resistant composite RO membranes that find special utility in water softening and nanofiltration applications such as separation of high molecular weight organics.

The novel polyamide RO membranes are prepared generally in accordance with the condensation polymerization reaction scheme noted above in the summary. The preferred form of condensation reaction is an interfacial polymerization reaction conducted by loading the microporous polymeric support with an aqueous solution of the tetrakis-aminomethyl compound (N,N',N'',N'''-tetramethyl)tetrakis-aminomethyl-methane (hereafter referred to as "TTAM") and immersing the so-loaded support in a nonaqueous solution of the polyacylhalide. The resulting composite membrane, generally comprising a thin film of the polyamide on the microporous support, may be air-dried and/or heat-cured.

The microporous support may be any of the types conventionally used in RO processes and may be in the form of flat sheets, tubes, or hollow fibers. Preferred supports are those prepared from polysulfone, polyethersulfone, polyetherimide, polyvinyl chloride, polyvinyl butyral, polystyrene, and cellulose esters. Polysulfone is most preferred in flat sheet form, while polyethersulfone and polyetherimide are most preferred in hollow fiber form.

Suitable aqueous solutions of TTAM may vary from 0.2 to 4.0 wt %, preferably 0.5 to 2.0 wt %, and may contain from 0.1 to 1.0 wt % acid scavenger such as triethylamine (TEA) and a minor amount of a surfactant to promote proper wetting of the support with the solution of TTAM.

The polyacylhalide reactant is preferably dissolved in nonpolar solvents such as aliphatics, halogenated aliphatics, cycloaliphatics and aromatics containing from 5 to 12 carbons. Aliphatics are most preferred. The polyacylhalide reactant should be present from 0.1 to 1.0 wt %, preferably 0.5 wt %.

EXAMPLES 1-3

An asymmetric, microporous, polysulfone flat-sheet support membrane approximately 4 mils thick was immersed in a 1 wt % aqueous solution of TTM containing 0.5 wt % TEA (as an acid scavenger) and 0.01 wt % Iconol NP-9 surfactant (BASF Wyandotte Corp. of Parsippany, N.J. The support membrane was then drained of excess solution and immersed in a 0.5 wt % solution of isophthayoyl chloride (IPC) in hexane for 30 seconds at room temperature, which caused formation of the polyamide film on the microporous surface of the polysulfone support. The resulting composite membrane was air-dried at room temperature overnight, then heat-cured in an oven for 10 minutes at 60° C. The membrane thus formed was then tested in an 800-psi RO test, with feed water containing 0.5 wt % MgSO₄ at pH 6.0 and 25° C. Following this, another 800-psi RO test was performed with feed water containing 0.5 wt % NaCl at pH 6.0 and 25° C. The results, with flux reported in units of gal/ft²-day (gfd), are shown in Table I.

TABLE I

| Example No. | 0.5 wt % MgSO₄ | | 0.5 wt % NaCl | |
|---|---|---|---|---|
| | Flux (gfd) | Rejection (%) | Flux (gfd) | Rejection (%) |
| 1 | 145 | 95 | 111 | 64 |
| 2 | 139 | 94 | 101 | 63 |
| 3 | 142 | 93 | 96 | 61 |

EXAMPLES 4-6

Three composite membranes were prepared and RO-tested in essentially the same fashion as in Examples 1-3, except they were not heat-cured. The results are shown in Table II.

TABLE II

| Example No. | 0.5 wt % MgSO₄ | | 0.5 wt % NaCl | |
|---|---|---|---|---|
| | Flux (gfd) | Rejection (%) | Flux (gfd) | Rejection (%) |
| 4 | 146 | 95 | 101 | 63 |

TABLE II-continued

| Example No. | 0.5 wt % MgSO4 | | 0.5 wt % NaCl | |
| --- | --- | --- | --- | --- |
| | Flux (gfd) | Rejection (%) | Flux (gfd) | Rejection (%) |
| 5 | 145 | 95 | 92 | 62 |
| 6 | 146 | 95 | 91 | 63 |

EXAMPLES 7-10

Four composite membranes were prepared, heat-cured and RO-tested in essentially the same manner as in Examples 1-3, with the exception that they were first rolled into spiral-wound modules having the respective surface areas noted. The results are shown in Table III.

TABLE III

| Example No. | Membrane Area (ft$^2$) | 0.5 wt % MgSO4 | | 0.5 wt % NaCl | |
| --- | --- | --- | --- | --- | --- |
| | | Flux (gfd) | Rejection (%) | Flux (gfd) | Rejection (%) |
| 7 | 0.4 | 30 | 92 | 28 | 56 |
| 8 | 0.7 | 44 | 82 | 54 | 50 |
| 9 | 1.0 | 32 | 88 | 38 | 58 |
| 10 | 1.0 | 35 | 91 | 23 | 61 |

EXAMPLES 11-14

Composite hollow fiber membranes were prepared at 25° C. using a polyethersulfone hollow fiber support that had been prepared in accordance with the method disclosed in U.S. Pat. No. 4,772,391. The polyamide film was formed on the lumens or inner surfaces of the hollow fibers by drawing an aqueous 2.0 wt % solution of TTAM containing 0.5 wt % TEA and 0.01 wt % surfactant into the lumens of the fibers for one minute; the TTAM solution was then displaced by forcing a second solution of 0.5 wt % IPC in hexane through the lumens. After 30 seconds contact time, residual solution of IPC was removed by pressurized nitrogen gas. The composite hollow fiber membranes were then heat-cured for 30 minutes at 60° C. by passing hot air through the lumens. The so-prepared membranes were potted into modules and RO-tested with a tube-side or lumens feed at 25° C. and 400 psi, with the results shown in Table IV.

TABLE IV

| Example No. | Membrane Area (ft$^2$) | 0.5 wt % MgSO4 | | 0.5 wt % NaCl | |
| --- | --- | --- | --- | --- | --- |
| | | Flux (gfd) | Rejection (%) | Flux (gfd) | Rejection (%) |
| 11 | 1 | 66 | 99 | 72 | 41 |
| 12 | 2 | 73 | 95 | 82 | 36 |
| 13 | 10 | 38 | 96 | 46 | 40 |
| 14 | 20 | 42 | 87 | 49 | 39 |

EXAMPLE 15

Three flat-sheet composite membrane were prepared and RO-tested in essentially the same manner as in Examples 1-3, with the exceptions of a pH of 5 and that chlorine was added to the feed water in the form of NaOCl to test resistance to degradation by chlorine attack. The averaged results of the three membranes are shown in Table V.

TABLE V

| Operating Time (hrs) | Chlorine Concentration (ppm) | Flux (gfd) | Rejection (%) |
| --- | --- | --- | --- |
| 0 | 0 | 52 | 66 |
| 1 | 10 | 52 | 63 |
| 3.5 | 10 | 46 | 61 |
| 55 | 10 | 40 | 55 |
| 76.5 | 10 | 37 | 58 |
| 142 | 10 | 36 | 67 |
| 167 | 10 | 35 | 63 |

As seen from the results in Table V, the composite RO membranes of the present invention exhibit extremely good resistance to chlorine attack, as evidenced both by maintaining extraordinary flux rates and only a 3% drop in rejection rates after continuous use over a period of nearly a week.

EXAMPLES 16-21

Six composite membranes were prepared and RO-tested in the same manner as in Examples 1-3, with the exceptions that 2 wt % of TTAM was used with trimesoyl chloride instead of IPC, and the heat cure was at 100° C. The results are shown in Table VI.

TABLE VI

| Example No. | 0.5 wt % MgSO4 | | 0.5 wt % NaCl | |
| --- | --- | --- | --- | --- |
| | Flux (gfd) | Rejection (%) | Flux (gfd) | Rejection (%) |
| 16 | 133 | 36 | 99 | 19 |
| 17 | 132 | 31 | 91 | 16 |
| 18 | 123 | 37 | 90 | 18 |
| 19 | 132 | 32 | 105 | 13 |
| 20 | 137 | 30 | 108 | 13 |
| 21 | 131 | 33 | 101 | 14 |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A composite reverse osmosis membrane comprising a microporous polymeric support and the polyamide reaction product of a tetrakis-aminomethyl compound of the formula $C+NHMe)_4$ with an aromatic polyacylhalide of the formula $Ar+COX)_n$ where Me is methyl, Ar is aryl, X is halide and n is 2 or 3.

2. The membrane of claim 1 wherein the reaction product is an interfacial polymerization reaction product.

3. The membrane of claim 1 or 2 wherein Ar is phenyl and X is chloride.

4. The membrane of claim 3 wherein n is 3.

5. The membrane of claim 1 or 2 wherein the microporous support is polysulfone.

6. The membrane of claim 3 wherein n is 2.

7. The membrane of claim 5 wherein n is 2 and the microporous support is a flat sheet.

8. The membrane of claim 5 wherein n is 2 and the microporous support is a hollow fiber.

* * * * *

UNITED STATES PATENT AND TRADEMARK OFFICE
CERTIFICATE OF CORRECTION

PATENT NO. : 4,876,009
DATED : Oct. 24, 1989
INVENTOR(S) : Scott B. McCray

It is certified that error appears in the above-identified patent and that said Letters Patent is hereby corrected as shown below:

Col. 2, Line 34: Change "N.J." to --N.J.)--.

Signed and Sealed this

Third Day of September, 1991

Attest:

HARRY F. MANBECK, JR.

Attesting Officer

Commissioner of Patents and Trademarks